(12) United States Patent
McCune

(10) Patent No.: US 9,374,332 B2
(45) Date of Patent: Jun. 21, 2016

(54) DISTRIBUTION LIST CREATION AND SUBSCRIPTION

(71) Applicant: Red Hat, Inc., Raleigh, NC (US)

(72) Inventor: Michael McCune, Beaverton, OR (US)

(73) Assignee: Red Hat, Inc., Raleigh, NC (US)

( * ) Notice: Subject to any disclaimer, the term of this patent is extended or adjusted under 35 U.S.C. 154(b) by 269 days.

(21) Appl. No.: 13/946,560

(22) Filed: Jul. 19, 2013

(65) Prior Publication Data

US 2015/0026270 A1 Jan. 22, 2015

(51) Int. Cl.
*H04L 12/58* (2006.01)

(52) U.S. Cl.
CPC .............. *H04L 51/28* (2013.01); *H04L 12/58* (2013.01)

(58) Field of Classification Search
CPC ................................ H04L 12/58; H04L 51/28
See application file for complete search history.

(56) References Cited

U.S. PATENT DOCUMENTS

| | | | |
|---|---|---|---|
| 5,864,684 A | 1/1999 | Nielsen | |
| 6,167,435 A | 12/2000 | Druckenmiller et al. | |
| 6,353,852 B1 * | 3/2002 | Nestoriak et al. | 709/206 |
| 6,816,884 B1 * | 11/2004 | Summers | 709/206 |
| 7,092,992 B1 * | 8/2006 | Yu | 709/206 |
| 7,467,183 B2 | 12/2008 | Arcuri et al. | |
| 7,657,599 B2 | 2/2010 | Smith | |
| 2007/0093259 A1 * | 4/2007 | Hyatt | 455/466 |
| 2007/0192476 A1 * | 8/2007 | Watanabe et al. | 709/223 |
| 2008/0288494 A1 | 11/2008 | Brogger et al. | |
| 2010/0306276 A1 * | 12/2010 | Davis et al. | 707/803 |

OTHER PUBLICATIONS http://www.surveygizmo.com/survey-software-support/tutorials/aweber-subscriber-list/—2005-2013, 2 pages.
https://support.google.com/mail/answer/81126?h1=en—Apr. 19, 2013, 4 pages.
http://www.spip.net/en_article3510.html—Dec. 2006, 2 pages.
http://www.deer-run.com/~hal/dns-sendmail/Demystifying-Sendmail.pdf—2005-2006, 282 pages.

* cited by examiner

*Primary Examiner* — Brian J Gillis
*Assistant Examiner* — Gil H. Lee
(74) *Attorney, Agent, or Firm* — Lowenstein Sandler LLP

(57) ABSTRACT

A method and system for the efficient creation and management of an e-mail distribution list. The method includes receiving, from a first sender, a first e-mail message directed to an e-mail address comprising a list name. An e-mail distribution list is created comprising a distribution list name, wherein the distribution list name is the list name of the e-mail address. The first sender is added as a first subscriber to the distribution list. A second e-mail communication directed to the e-mail address is received and the second sender is added as a second subscriber to the e-mail distribution list in view of the second e-mail communication.

18 Claims, 4 Drawing Sheets

DISTRIBUTION LIST CREATION AND SUBSCRIPTION

TECHNICAL FIELD

Embodiments of the present disclosure relate to distribution list creation, and more specifically, to a method and system for creating an electronic mail (e-mail) distribution list without requiring external administrative actions.

BACKGROUND

The conventional creation of e-mail distribution lists is typically an administratively intensive process, involving human intervention to establish a distribution list and manage subscriptions to the list. For example, establishing traditional e-mail distribution lists usually involves performing various management functions by administrators, including completing web forms, obtaining necessary approvals, configuring distribution list settings, and managing the subscription process within a centralized e-mail distribution system.

DETAILED DESCRIPTION

In a computing environment, it may be desired to create and manage electronic mail (e-mail) distribution lists according to an automated protocol. In a conventional system, significant involvement by an administrator of a centralized e-mail distribution system is needed to create a new distribution list and add new members or subscribers to an active list. In this regard, current e-mail list software relies on manually-intensive actions by the administrator, including filling out forms, checking permissions, and managing subscriptions.

The present disclosure relates to e-mail distribution list management methods and systems that provide for the efficient creation and management of e-mail distribution lists (or "etherlists"). Advantageously, the e-mail distribution list management system allows a user to create a new distribution list by transmitting an e-mail directed to an e-mail address in the conventional format (i.e., list name@domain name), wherein the domain name is associated with a computing system hosting an e-mail distribution list creation component of the present disclosure. The user's e-mail represents a request for the creation of a new distribution list having a distribution list name matching the "list name" portion of the e-mail address. Advantageously, the user may select the distribution list name which he or she desires, by employing that desired list name as the "list name" portion of the e-mail directed to the domain name associated with the host computing system. Once the new e-mail distribution list is created, subsequent e-mail messages directed to the same e-mail address from another sender serves as a request to subscribe to the created distribution list.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
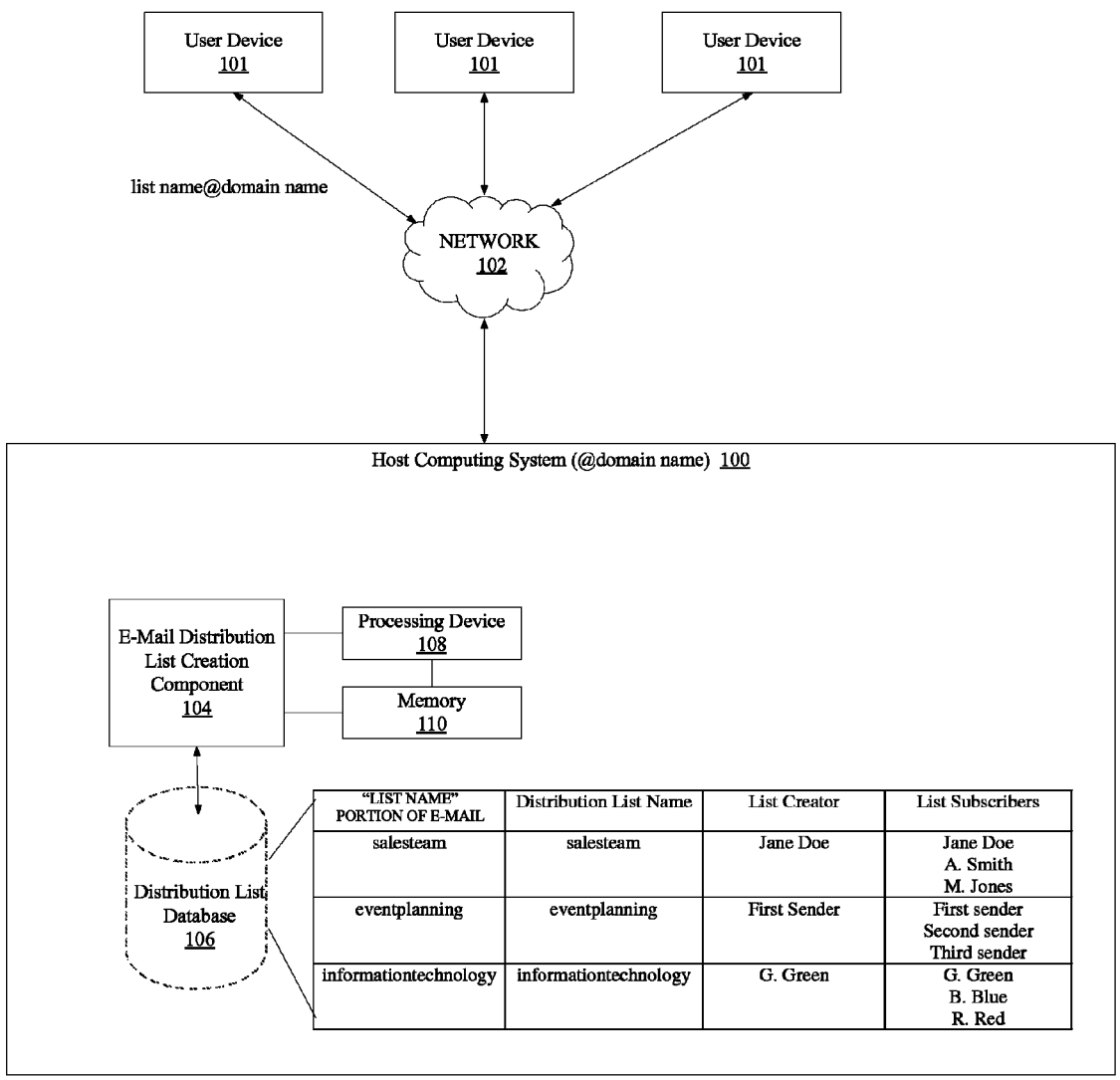
FIG. 1 is a block diagram of an example system for creating and managing an e-mail distribution list, according to aspects of the present disclosure.

FIG. 1 is a block diagram that illustrates an example computing environment including a host computing system 100 including an e-mail distribution list creation component 104 in communication with one or more user devices 101 via a network 102 (e.g., a public network such as the Internet, a private network such as a local area network (LAN), or a virtual private network (VPN)). The host computing system 100 may be any suitable computing system, such as a server, a workstation, a personal computer (PC), a mobile phone, a palm-sized computing device, a personal digital assistant (PDA), a virtual computing system, etc. The host computing system 100 is associated with a domain name such that an e-mail communication from a user device 101 directed to an e-mail address having the domain name is received by the host computing system 100.

The e-mail distribution list creation component 104 is a software component (e.g., a set of instructions residing in memory 110) executable by a processing device (e.g., processing device 108) to perform the e-mail distribution list creation and management activities described herein (e.g., the methods described in detail in connection with FIGS. 2-4). Memory 110 may be any suitable computer readable storage medium, including volatile memory devices (e.g., random access memory (RAM)), non-volatile memory devices (e.g., flash memory), a magnetic hard disk, a Universal Serial Bus (USB) solid state drive, etc., a local disk, an external disk, and/or other types of memory devices).

The e-mail distribution list creation component 104 is coupled to a distribution list database 106 for maintaining records associated with the distribution lists, such as, for example, multiple created distribution list profiles identifying the distribution list creator and subscription list. The distribution list database 106 may be hosted by the host computing system 100, or, alternatively, hosted by another computing device communicatively coupled to the host computing system 100 (as denoted by the dashed lines). The memory 110 may be configured to store the distribution list database 106 including the distribution list information (e.g., the example table shown in FIG. 1). As shown in FIG. 1, the distribution list database 106 may include the distribution list information in any suitable data structure, including, for example, tabular form. For example, the distribution list information may include records or profiles identifying the "list name" portion of the e-mail, the distribution list name, the list creator, the list subscribers, and any other suitable list information.

As shown, a user device 101 may transmit an e-mail message directed to an e-mail address including a "list name" portion and a "domain name" portion (e.g., list name@domain name). The "list name" portion represents the desired distribution list name for the distribution list which the user wishes to create. The e-mail communication is received by the e-mail distribution list creation component 104 for processing in accordance with the example method shown in FIGS. 2-4.

The various components of the host computing system 100 may reside on different computing devices and may be physically or virtually located in any number of different locations.

Accordingly, any desired distributed arrangement of the host computing system 100 may be achieved.

Figure 2:
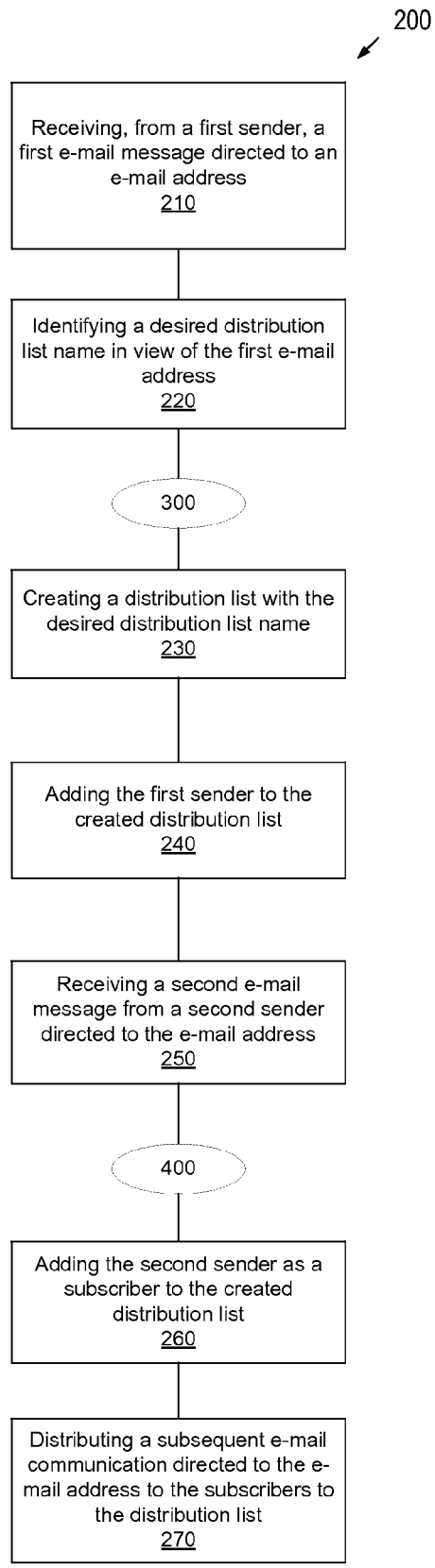
FIG. 2 is a flow diagram of an example method for creating and managing an e-mail distribution list, according to aspects of the present disclosure.

FIG. 2 is a flow diagram illustrating an example of a method 200 relating to the creation and management of an etherlist, in accordance with aspects of the present disclosure. In an example, the method 200 may be performed by a host computing system (e.g., host computing system 100 of FIG. 1) including an e-mail distribution list creation component (e.g., the e-mail distribution list creation component 104 of FIG. 1) that may include hardware (e.g., circuitry, dedicated logic, programmable logic, microcode, etc.), software (e.g., instructions executed by a processing device), or a combination thereof.

In block 210, the e-mail distribution list creation component receives an e-mail communication from a user device (e.g., user device 101 of FIG. 1) directed to an e-mail address having a "list name" portion and a "domain name" portion, wherein the domain name is associated with a computing system hosting the e-mail distribution list creation component. For example, for an e-mail address of "informationtechnology@XYZdomain.com", the list name portion is "informationtechnology" and the domain name portion is "XYZdomain". According to an aspect of the present disclosure, a user associated with the user device (i.e., the first sender or the initiator of the distribution list) seeking to create a distribution list directs the e-mail communication to a list name which the user selects as the desired distribution list name. In the example above, the desired distribution list name is "informationtechnology".

In block 220, e-mail distribution list creation component identifies the desired distribution list name by analyzing the "list name" portion of the incoming e-mail communication. In an embodiment, the e-mail distribution list creation component performs a check in an associated database (e.g., the distribution list database 106 in FIG. 1) to determine whether the requested distribution list name is available, or if it is already in use. In an example, a user (e.g., G. Green) wishing to create a new distribution list named "informationtechnology" may send an e-mail communication to "informationtechnology@domain name", wherein the domain name is associated with a server hosting the e-mail distribution list creation component.

If the distribution list name is available (i.e., not being used), the e-mail distribution list creation component creates a new distribution list with the desired distribution list name and stores a record in the distribution list database relating to the new distribution list. As shown in FIG. 1, the associated record may include suitable distribution list information, such as, for example, the list name of the incoming e-mail communication, the distribution list name, the list creator, and the list subscribers. In an embodiment, the record may further include information regarding the privileges and/or rules associated with the distribution list, such as, for example, subscriber-control rights of the list creator, rules governing the use, format, configuration, and/or specifications of the e-mail distribution list, a period of time for the e-mail distribution list (e.g., identifying an expiration date for the list), etc.

Figure 3:
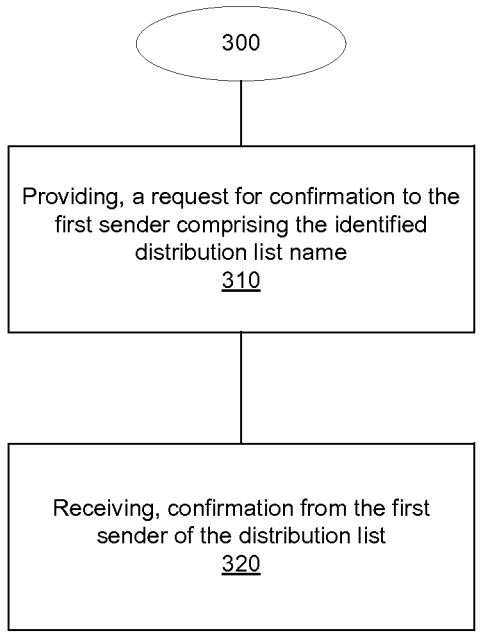
FIG. 3 is a flow diagram of an example method for creating an e-mail distribution list, according to aspects of the present disclosure.

In an embodiment, after confirming the desired distribution list name, the e-mail distribution list creation component may proceed to a confirmation method 300 (as denoted by the dashed lines), as shown in FIG. 3. As shown in FIG. 3, in step 310, having confirmed the availability of the desired distribution list name, the e-mail distribution list creation component provides the user device (i.e., the first sender or initiator of the distribution list) with a request for confirmation to confirm that the user wishes to create the identified distribution list. In an embodiment, the confirmation communication from the e-mail distribution list creation component may be an e-mail including a uniform resource locator (URL) representing a "confirmation link".

In block 320, the e-mail distribution list creation component receives a confirmation from the user of the distribution list, and in response, creates the new distribution list in block 230 of FIG. 2. In an embodiment, the confirmation may be received by the e-mail distribution list creation component as a response to the user clicking the confirmation link representing the user's confirmation of his or her desire to create the new distribution list.

In block 240, the list creator (e.g., the first sender or list initiator) is added as a subscriber to the created distribution list. In an embodiment, the list creator may be granted certain privileges, rights, and/or permissions, such as, for example, the right to deny or allow subscription requests from other users, the right to control the content, format and/or structure of the e-mail communications transmitted to distribution list, the ability to control privacy settings associated with the distribution list, etc.

In block 250, the e-mail distribution list creation component receives an e-mail communication from a second user (e.g., a prospective subscriber) directed to the same e-mail address used to create the distribution list (e.g., the same list name and domain name). In the example, above, the second (or subsequent) e-mail communication is directed to the "informationtechnology@domain name" address. In an embodiment, the e-mail distribution list creation component checks the distribution list database to determine whether a distribution list record exists for the identified list name associated with the incoming e-mail communication. If a record exists, then the e-mail distribution list creation component treats the e-mail communication as a request to subscribe to the existing distribution list.

Figure 4:
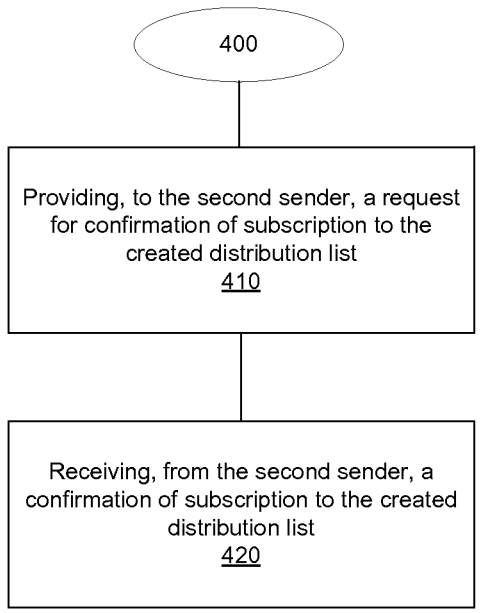
FIG. 4 is a flow diagram of an example method for managing a subscription to a created e-mail distribution list, according to aspects of the present disclosure.

In an embodiment, after confirming the e-mail communication represents a subscription request, the e-mail distribution list creation component may proceed to an optional confirmation method 400 (as denoted by the dashed lines), as shown in FIG. 4. As shown in FIG. 4, in step 410, the e-mail distribution list creation component provides the user device (i.e., the second sender or prospective subscriber) with a request for confirmation to confirm that the user wishes to subscribe to the identified distribution list. In an embodiment, the confirmation communication from the e-mail distribution list creation component may be an e-mail including a uniform resource locator (URL) representing a "confirmation link".

In block 420, the e-mail distribution list creation component receives a confirmation from the prospective subscriber (e.g., the second sender), and in response, creates the new distribution list in block 230 of FIG. 2. In an embodiment, the confirmation may be received by the e-mail distribution list creation component as a response to the user clicking the confirmation link representing the user's confirmation of his or her desire to subscribe to the distribution list.

With reference to FIG. 2, the e-mail distribution list creation component adds the second sender to the distribution list, in block 260. In an embodiment, the distribution list record in the distribution list database is updated to include the second sender as a subscriber to the distribution list. In an embodiment, the e-mail distribution list creation component provides a notification to the list creator alerting them of the subscription request or addition of the subscriber. In a further embodiment, the list creator may be granted the right to provide his or her approval of the subscription or denial of the subscription request. If, in this embodiment, the list creator denies access to a prospective subscriber, the e-mail distribution list may provide a communication to the prospective subscriber and add information relating to the denial in the associated distribution list record. Blocks 250 and 260 may be repeated for all subsequent e-mail communications (e.g., a third e-mail message, a fourth e-mail message, etc.) directed to the e-mail address in order to add additional subscribers (e.g., a third sender, a fourth sender, etc.).

In an embodiment, the distribution list may be "closed" by the e-mail distribution list creation component such that no further subscribers are added and the distribution list may be used by the subscribers for communication purposes. In an embodiment, the distribution list may be closed based on an instruction from the list creator or based on a parameter set by the list creator (e.g., a limit of ten subscribers). In another embodiment, the distribution list may be deemed closed after the expiration of a set period of time starting from the date/time the list was created (e.g., the list is closed to further subscribers after a 10 day subscription period).

Having created the distribution list and added the associated subscribers, subsequent communications directed to the e-mail address associated with the distribution list are distributed to the associated subscribers by the e-mail distribution list creation component, in block 270. Advantageously, the subscribers to the distribution list may send an e-mail communication and associated content to the other subscribers on the distribution list by using the original "list name@domain name" e-mail address.

In an embodiment, the e-mail distribution list creation component may manage the unsubscribe functions associated with a distribution list. For example, the e-mail distribution list creation component may receive an "unsubscribe" request from either a current subscriber or the list creator and process remove the identified subscriber from the list via an update to the subscriber list in the associated distribution list record. For example, e-mail communications sent to the distribution list may include an "unsubscribe" link which a subscriber can select in order to generate and send an unsubscribe communication to the e-mail distribution list.

According to aspects of the present disclosure, the e-mail distribution list creation component may be configured to provide additional e-mail functionality, such as, maintaining time-based archives of the distribution lists in the distribution list database, spam controls including the ability to block certain senders from communicating with the subscribers of a distribution list, throttling controls (e.g., limiting the amount of e-mail communications that may be sent to and/or from a distribution list), etc.

Figure 5:
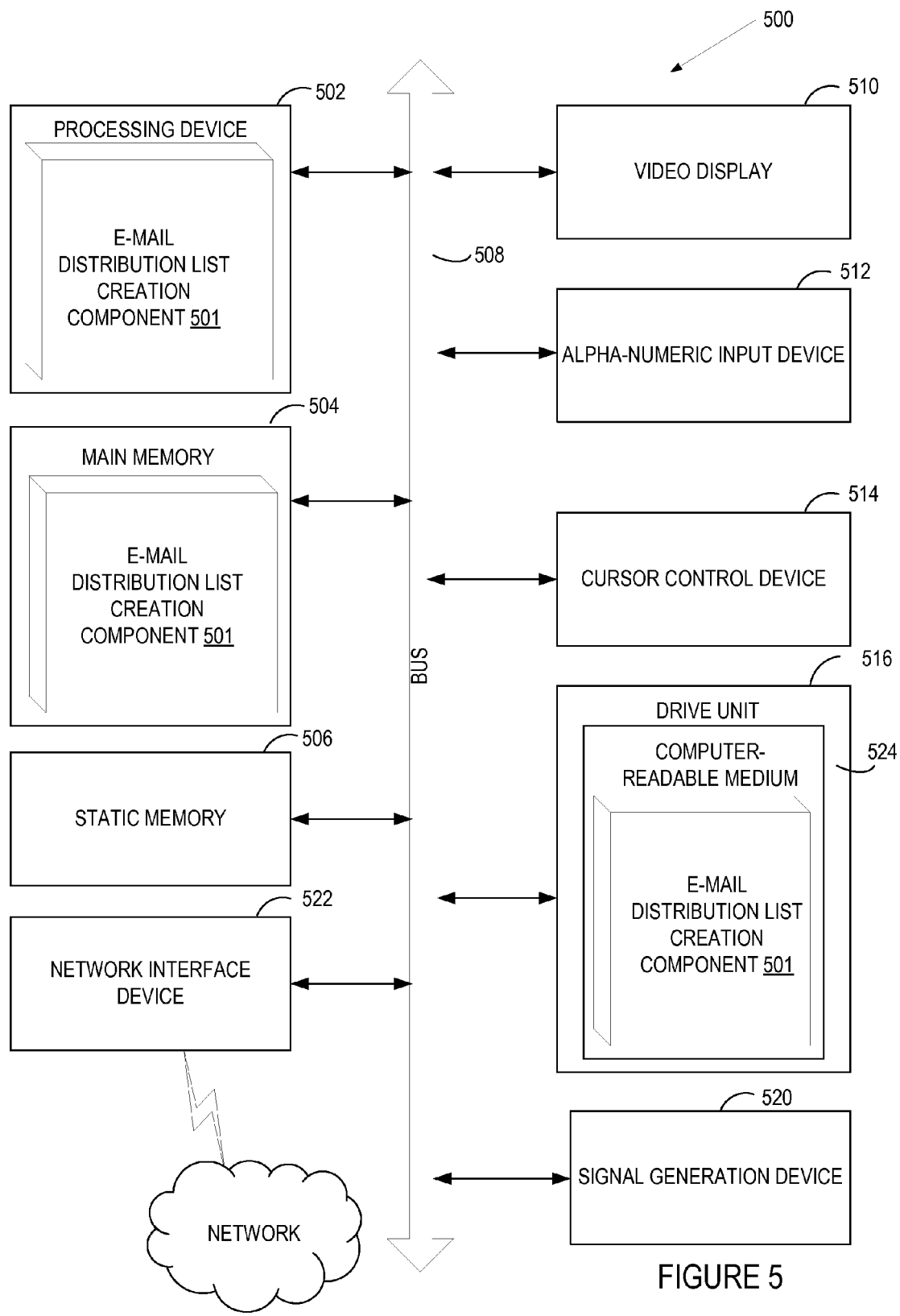
FIG. 5 illustrates a diagrammatic representation of an e-mail distribution list management system, according to aspects of the present disclosure.

FIG. 5 illustrates an example computer system including an e-mail distribution list creation component 501 configured to perform any one or more of the methodologies discussed herein. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. According to an aspect of the present disclosure, due to the segmented and distributed architecture of the business process engine, the illustrative computer system 500 may be composed of multiple different computer systems configured to execute e-mail distribution list creation component 501.

The illustrative computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 (e.g., a processor) represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the e-mail distribution list creation component 501 to perform the operations discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 for storing instructions associated with the e-mail distribution list creation component 501 (e.g., instructions corresponding to the methods of FIGS. 2-4 embodying any one or more of the methodologies or functions described herein. The instructions of the e-mail distribution list creation component 501 may also reside, completely or at least partially, within the main memory 504 and/or within the processing device 502 during execution thereof by the computer system 500, the main memory 504 and the processor 502 also constituting computer-readable media. Instructions 501 may further be transmitted or received over a network via the network interface device 522.

While the computer-readable storage medium 524 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "identifying", "creating", "adding", "distributing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device of a host computer from a first user device associated with a first sender, a first e-mail message directed to an e-mail address comprising a list name and a domain name associated with the host computer, wherein the first e-mail message represents a request to create an e-mail distribution list;
determining the list name is available by checking a database comprising a plurality of distribution list records;
creating, by the processing device, the e-mail distribution list comprising a distribution list name in response to receiving the first e-mail message, wherein the distribution list name is the list name of the e-mail address;
adding the first sender as a first subscriber to the distribution list;
receiving, from a second user device associated with a second sender, a second e-mail communication directed to the e-mail address; and
adding the second sender as a second subscriber to the e-mail distribution list in view of the second e-mail communication.

2. The method of claim 1, further comprising:
receiving a subsequent e-mail communication directed to the e-mail address; and
distributing the subsequent e-mail communication to the first and second subscribers.

3. The method of claim 1, further comprising:
receiving, from a plurality of additional senders, a plurality of e-mail communications directed to the e-mail address;
adding the plurality of additional senders as a plurality of additional subscribers to the distribution list; and
distributing a subsequent e-mail communication directed to the e-mail address to the first subscriber, the second subscriber, and the plurality of additional subscribers.

4. The method of claim 1, further comprising:
providing, to the first sender, a request for confirmation of creation of the distribution list; and
receiving, from the first sender, a confirmation of the creation of the distribution list.

5. The method of claim 1, further comprising:
providing, to the second sender, a request for confirmation of subscription to the distribution list; and
receiving, from the second sender, a confirmation of subscription of the second sender to the distribution list.

6. The method of claim 1, further comprising maintaining the database comprising the plurality of distribution list records each comprising distribution list information.

7. A non-transitory computer readable storage medium comprising instructions that, when executed by a processing device, cause the processing device to:
receive, by a processing device of a host computer from a first user device associated with a first sender, a first e-mail message directed to an e-mail address comprising a list name and a domain name associated with the host computer, wherein the first e-mail message represents a request to create an e-mail distribution list;

determine the list name is available by checking a database comprising a plurality of distribution list records;

create, by the processing device, the e-mail distribution list comprising a distribution list name in response to receiving the first e-mail message, wherein the distribution list name is the list name of the e-mail address;

add the first sender as a first subscriber to the distribution list;

receive, from a second user device associated with a second sender, a second e-mail communication directed to the e-mail address; and add the second sender as a second subscriber to the e-mail distribution list in view of the second e-mail communication.

8. The non-transitory computer readable storage medium of claim 7, the processing device to:
receive a subsequent e-mail communication directed to the e-mail address; and
distribute the subsequent e-mail communication to the first and second subscribers.

9. The non-transitory computer readable storage medium of claim 7, the processing device to:
receive, from a plurality of additional senders, a plurality of e-mail communications directed to the e-mail address;
add the plurality of additional senders as a plurality of additional subscribers to the distribution list; and
distribute a subsequent e-mail communication directed to the e-mail address to the first subscriber, the second subscriber, and the plurality of additional subscribers.

10. The non-transitory computer readable storage medium of claim 7, the processing device to:
provide, to the first sender, a request for confirmation of creation of the distribution list; and
receive, from the first sender, a confirmation of the creation of the distribution list.

11. The non-transitory computer readable storage medium of claim 7, the processing device to:
provide, to the second sender, a request for confirmation of subscription to the distribution list; and
receive, from the second sender, a confirmation of subscription of the second sender to the distribution list.

12. The non-transitory computer readable storage medium of claim 7, the processing device to maintain the database comprising the plurality of distribution list records each comprising distribution list information.

13. A system comprising:
a memory to store instructions; and
a processing device of a host computer operatively coupled to the memory, the processing device to execute the instructions to:
receive, by the processing device from a first user device associated with a first sender, a first e-mail message directed to an e-mail address comprising a list name and a domain name associated with the host computer, wherein the first e-mail message represents a request to create an e-mail distribution list;
determine the list name is available by checking a database comprising a plurality of distribution list records;
create, by the processing device, the e-mail distribution list comprising a distribution list name in response to receiving the first e-mail message, wherein the distribution list name is the list name of the e-mail address;
add the first sender as a first subscriber to the distribution list;
receive, from a second user device associated with a second sender, a second e-mail communication directed to the e-mail address; and
add the second sender as a second subscriber to the e-mail distribution list in view of the second e-mail communication.

14. The system of claim 13, the processing device to:
receive a subsequent e-mail communication directed to the e-mail address; and
distribute the subsequent e-mail communication to the first and second subscribers.

15. The system of claim 13, the processing device to:
receive, from a plurality of additional senders, a plurality of e-mail communications directed to the e-mail address;
add the plurality of additional senders as a plurality of additional subscribers to the distribution list; and
distribute a subsequent e-mail communication directed to the e-mail address to the first subscriber, the second subscriber, and the plurality of additional subscribers.

16. The system of claim 13, the processing device to:
provide, to the first sender, a request for confirmation of creation of the distribution list; and
receive, from the first sender, a confirmation of the creation of the distribution list.

17. The system of claim 13, further comprising:
provide, to the second sender, a request for confirmation of subscription to the distribution list; and
receive, from the second sender, a confirmation of subscription of the second sender to the distribution list.

18. The system of claim 13, the processing device to store, in the database, the plurality of distribution list records each comprising distribution list information.

* * * * *